April 18, 1933.    B. R. BARDER    1,904,967
PIPE JOINT AND THE METHOD OF MAKING SAME
Filed Aug. 9, 1929
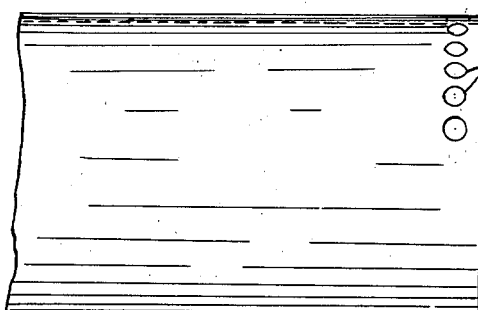
Fig. 1.
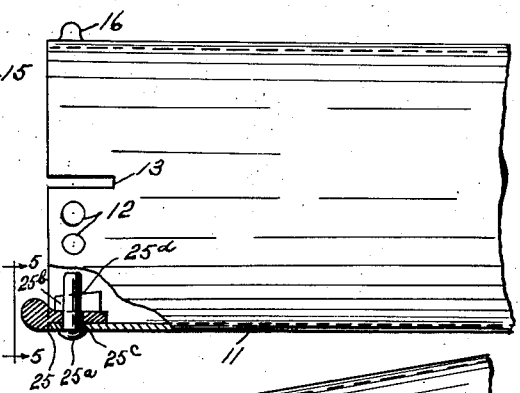
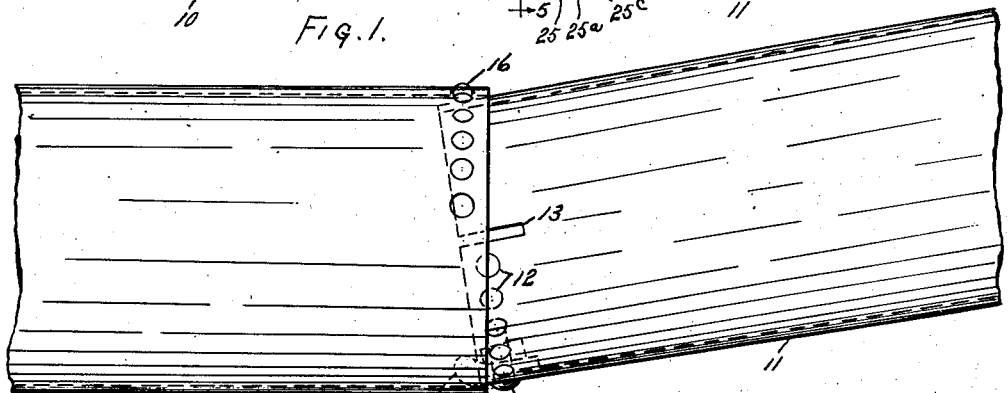
Fig. 2.
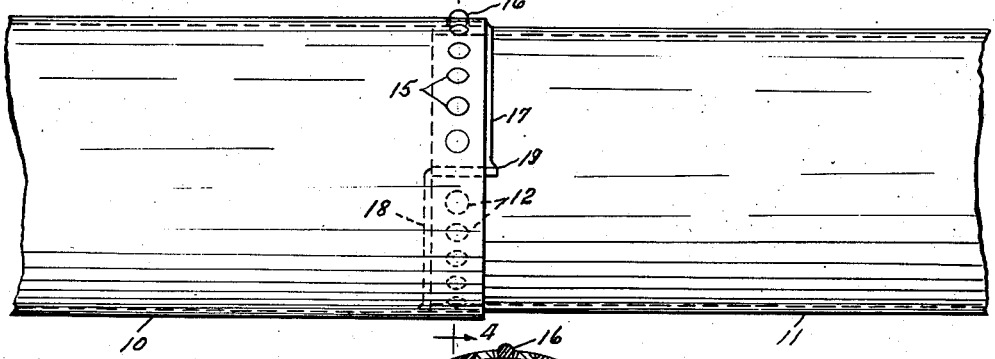
Fig. 3.
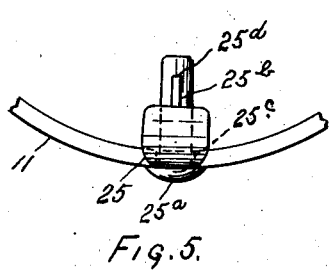
Fig. 5.
Fig. 4.
INVENTOR
BYRON R. BARDER.
By Ely & Barrow
ATTORNEYS Patented Apr. 18, 1933

1,904,967

UNITED STATES PATENT OFFICE

BYRON R. BARDER, OF AKRON, OHIO, ASSIGNOR TO THE BIGGS BOILER WORKS COMPANY, OF AKRON, OHIO, A CORPORATION OF OHIO

PIPE JOINT AND THE METHOD OF MAKING SAME

Application filed August 9, 1929. Serial No. 384,722.

This invention relates to a new and improved form of joint or connection for large pipes and particularly to a welded leak proof joint which is adaptable for installation in the field and to a method for making such a joint.

An object of the invention is to provide a welded joint in horizontal piping where all of the welding may be done in a downward direction and to provide a method for making said joint. Heretofore, in joining large horizontal pipe sections together by welding, it has been necessary to either roll the pipes over when part of the weld has been made, or to weld portions of the joint upwardly, the pipes remaining stationary. In the first method, the rolling over of the pipes, especially when very large, has been found difficult and expensive, and the second method, that of welding upwardly, presents great difficulties. It is practically impossible to keep the molten metal in the opening or in the joint to be welded and moreover it is always more difficult to work upwardly in any job handling tools, hence when all the operations can be done downwardly, a better job results.

An additional object of the invention is to provide preliminary engaging means on the pipes for assisting and facilitating the lining up and the engaging of the pipes to be joined.

It will be understood that the invention is not limited in application to the specific embodiment shown and described below as one form thereof.

Of the accompanying drawing:

Figure 1 is a side elevation of two adjacent pipe ends showing the features of construction which enable them to be joined by the herein described method;

Figure 2 is a side elevation of the pipe ends of Figure 1 showing the manner in which the pipes are lined up and engaged;

Figure 3 is a side elevation of the completed joint made by the process and embodying the features of the invention;

Figure 4 is a sectional view on line 4—4 of Figure 3; and

Figure 5 is a view on line 5—5 of Figure 1.

The numerals 10 and 11 indicate two adjacent telescoping ends of pipe sections. These pipes may be of any size or shape but are large enough to admit a workman to the inside thereof or to permit welding operations to be effectively performed therein. The invention is generally employed in joining pipes ranging from two to eight feet in diameter and from one-eighth to over one inch in the thickness of the walls.

The end of the pipe 11, which may be designated as the entering or male member of the joint, may be formed with a plurality of recesses or rivet openings 12 in the lower semi-circumference thereof. Slots 13 are also provided in one of the pipe ends preferably at diametrically opposite points, the slots preferably being formed at the ends of the semi-circle of recesses 12 at the sides of the male pipe end. The upper semi-circumference of the female or receiving pipe end 10 may be provided with a plurality of spaced recesses 15, similar to those in the male pipe end but arranged about the upper semi-circumference thereof.

To facilitate assembly of the pipe sections, a stud 16 may be formed on the upper side of the male pipe end 11, preferably in the plane of the recesses 12 so that it will fit in one of the recesses 15, preferably at the top of the upper semi-circumference of the female member. Also one or more cam shoes 25 may be provided on the lower portion of one of the pipe members as for example, the male member to engage the other pipe end as shown in Figure 2 in such a way as to utilize the weight of the pipe section being connected in the line as said section is lowered to assist in guiding the pipe sections in mating relation. The shoe 25 is adapted to be removably secured to the male pipe end as by a key bolt 25$^a$ inserted through an aperture 12 therein and through an aperture 25$^c$ in the shoe, a tapered key 25$^b$ being provided to engage in a slot 25$^d$ in the bolt to hold the shoe 25 in place.

When the joint is to be made, the pipe 10 is generally a part of the permanent line or is already installed in position, usually in a ditch or trench. The pipe 11 is brought into approximately joining position with the pipe 10. In most cases this is done by a crane which supports the pipe with a chain about its center. The pipe 11 is then tipped as shown in Figure 2, such tipping being facilitated by a center supporting chain as above mentioned. The tipping permits easy inserting of the stud 16 of the male pipe in the top recess of the recesses 15 in the female pipe. The male pipe 11 is then lowered into place, the shoe or shoes 25 engaging the lower edge of the female pipe end and guiding the lower portion of the male pipe end into the female pipe end, the key 25$^b$ being driven out from inside the pipe to release the bolt 25$^a$ which drops out of the aperture 12, permitting the shoe 25 to be removed and permitting final lining up of the pipe sections. The stud 16 correctly positions the recesses and the openings in the pipes both axially and longitudinally so that the welding can be correctly and easily done. The holes 12 are now filled up by welding metal. This form of connection is known in the trade as an "electric rivet", it being understood that this is a welded connection in which the openings 12 are filled with metal fused and welded to the adjacent pipe surfaces by an electric arc. As the lower half of the pipe is welded in this manner from within the pipe, the welding operation is downwardly and can therefore be easily and effectively performed and closely observed by the workman, and at the same time there is no danger of molten metal dropping out of the opening.

The upper half of the "rivet" joint is welded from the outside, the workman filling the recesses 15 with his welds.

In Figures 3 and 4, which show the completed joint, the numeral 17 indicates a sealing strip of welding metal, the joint being thus welded through the upper half of the joint from the outside. A sealing strip 18 of welding metal is applied on the inside bottom half of the joint and welding metal 19 is applied in the slots 13, which is adapted to connect the inner seal 18 to the outer seal 17.

The caulking seals 17, 18 and 19 are made by applying seals 18 and 19 downwardly to the bottom inside half of the joint, the slots 13 also being filled from within and by applying seal 17 downwardly to the upper outside half of the pipe from the outside. The two seals 17 and 18 are thus connected from the inside to the outside of the joint through the slots 13 by the sealing metal 19.

It will be observed that by the division of the welding between the inner and the outer surfaces of the pipe in the manner described, the entire welding process takes place downwardly and none takes place upwardly, with the beneficial results indicated, and that by provision of the connection between the two parts of the caulking seal, a complete sealing of the joint results. The entire operation of welding the joint may be performed without enlarging a trench about the joint where a pipe line is being thus connected.

It is the intention usually to rely upon the welding through the holes and the spacing and pitch of the "rivets" for the strength of the joint. However, it will be apparent that in some instances the joint will have sufficient strength when the caulking weld alone is made, which dispenses with the use of the "rivets" and thus cheapens and expedites the formation of the joint. The location and design of the rivets and of the caulking weld may be modified or changed, depending upon the thickness of the plates and the pressure to be withstood. The recesses 12 and 15 are preferably countersunk to facilitate the welding operation.

It will be noted that the interengaging stud and recess 15 facilitate assembling two pipe sections out of alignment with each other as where the direction of the line changes while holding the adjoining pipe ends so overlapped as to permit effective welding thereof.

It is understood that the invention is capable of application in other than the specific form shown. Accordingly various modifications of the invention can be resorted to without departing from the spirit of the invention or the scope of the appended claims.

What is claimed is:

1. The method of joining a male end of a pipe section to a female end of a pipe section which comprises forming recesses in the lower half of the male pipe end and in the upper half of the female pipe end, providing opposed slot-like openings in the end of one of the pipes, bringing the two pipe ends into approximately horizontal alignment with the slots in the male pipe end at the sides thereof, and telescoping the male end in the female end, welding the pipes together through the recesses then caulk welding the upper half of the joint from the outside and the lower half from the inside, and connecting the inner and outer caulking welds together through the slot-like openings in the male pipe end.

2. The method of joining a male end of a pipe section to a female end of a pipe section which comprises forming recesses in the lower half of the male pipe end and in the upper half of the female pipe end, providing opposed slot-like openings in the end of one of the pipes, forming a projecting stud on the male pipe end, bringing the two pipe ends into approximate position, tipping the one pipe in relation to the other, engaging the stud of the male pipe in an upper recess of the female pipe end, lowering the pipe section into alignment, whereby the stud positions the recesses in the female pipe end on the upper side and the recesses of the male pipe end on the lower side of the line with the slots at the sides of the latter, welding the pipes together through the recesses, then caulk welding the upper half of the joint from the outside and the lower half from the inside, and connecting the inner and outer caulking welds together through the slot-like openings in the male pipe end.

3. The method of joining a male end of a pipe section to a female end of a pipe section which comprises forming recesses in the lower half of the male pipe end and in the upper half of the female pipe end, forming a projecting stud on the male pipe end, bringing the two pipe ends into approximate position, tipping the one pipe in relation to the other, engaging the stud of the male pipe in an upper recess of the female pipe end, lowering the pipe section into alignment, whereby the stud positions the recesses in the female pipe end on the upper side and the recesses of the male pipe end on the lower side of the line, and welding the pipes together through the recesses.

4. The method of joining the male end of a pipe section to the female end of a pipe section which comprises providing opposed slot-like openings at the sides of the end of one of the pipes, then caulk welding the upper half of the joint from the outside and the lower half from the inside, and conecting the inner and outer caulking welds together through the slot-like openings.

5. The method of forming a seal for a pipe joint including pipes having male and female pipe ends, which comprises providing opposed openings in the male pipe end, then caulk welding the upper half of the joint from the outside and the lower half from the inside, and connecting the inner and outer caulking welds together through the openings in the male pipe end.

6. The method of forming a seal for a pipe joint including pipes having mating pipe ends, which comprises providing opposed openings at the sides of one of the pipe ends, then caulk welding the upper half of the joint from the outside and the lower half from the inside, and connecting the inner and outer caulking welds together through the openings in said pipe end.

7. The method of joining a male pipe end and a female pipe end together while approximately horizontal, which comprises forming diametrically opposite slots in the end of one of the pipes, placing the male pipe end into the female pipe end so that the opposed slots are at the sides of the joint, then welding the upper half of the joined pipes together on the outside, welding the lower half of the pipes together on the inside, and connecting the two welds together through the opposed slots by a further weld.

8. The method of joining two pipes, which comprises telescoping the ends of the pipes together in an approximately horizontal position, welding the upper half of the joint from the outside and the lower half of the joint from the inside, and connecting the two welds together through the joint whereby a leak-proof joint is made entirely with downwardly directed welding operations.

9. A permanent pipe joint comprising two aligned pipes, one having a male and the other a female end, oppositely disposed slots in one pipe end, an outside weld joining the upper half of the pipes together, an inside weld joining the lower half of the pipes together, and a weld connecting the inside and outside welds through the slots.

10. A permanent pipe joint comprising two aligned pipes, one having a male and the other a female end, an outside weld joining the upper half of the pipes together, an inside weld joining the lower half of the pipes together, and a weld connecting the inside and outside welds.

11. A permanent pipe joint comprising two horizontally aligned pipes, one having a male and the other a female end, oppositely disposed slots in one pipe end, an outside weld joining the upper half of the pipes together, an inside weld joining the lower half of the pipes together, and a weld connecting the inside and outside welds through the slots.

12. A pipe joint comprising two aligned pipes, one having a male and the other a female end, a plurality of welded connections between the male and the female ends, the connections in the female end being located wholly in one or more openings in the upper half of the pipe, connections in the male end being located wholly in one or more openings in the lower half of the pipe, oppositely disposed slots in one pipe end, an outside seal about the upper half of the pipes, an inside seal about the lower half of the pipes, and a seal connecting the inside and outside seals through the slots.

13. That method for joining pipes in mating relation comprising providing an interengaging stud and recess on the upper portions of adjoining pipe ends, providing one or more removable cam shoes on the lower portion of one pipe end adapted to engage the lower portion of the other pipe end, tilting one pipe section respecting the other to interengage the stud and recess and relatively lowering the tilted section into line with the other section whereby the shoe or shoes will guide the lower portions of the pipe ends into mating relation, and removing the cam shoe or shoes to permit completion of the joint.

14. That method for joining pipes in mating relation comprising providing an interengaging means on the upper portions of adjoining pipe ends, providing one or more removable cam shoes on the lower portion of one pipe end adapted to engage the lower portion of the other pipe end, tilting one pipe section respecting the other to interengage said means and relatively lowering the tilted section into line with the other section whereby the shoe or shoes will guide the lower portions of the pipe ends into mating relation, and removing the cam shoe or shoes to permit completion of the joint.

15. The method of welding pipe including sections having mating ends provided with recesses therein for welding, which method comprises forming a projecting stud on one pipe end to engage in a recess for welding in the other pipe end, tipping one pipe section in relation to the other, engaging the stud of one pipe in the recess of the other, lowering the pipes into alignment whereby the stud correctly positions the pipes in joining relating to each other, and welding the joint through said welding recesses.

16. A welded pipe joint comprising two horizontally aligned pipes, one having a male end and the other a female end, and a radially projecting stud on the male pipe end engaged in a recess in the female pipe end, the stud and the recess being at the top of the joint, and the pipe joint being welded about the joint and through said recess.

17. A permanent welded pipe joint comprising two aligned pipes, one having a male end and the other a female end, and a radially projecting stud on the male pipe end engaged in a recess in the female pipe end, the stud and the recess being at the top of the joint, and the pipe joint being welded about the joint and through said recess.

18. That method for welding pipes in mating relation comprising providing an interengaging means including a projection and recess on the upper portions of adjoining pipe ends, providing one or more cam shoes on the lower portion of one pipe end adapted to engage the lower portion of the other pipe end, and tilting one pipe section respecting the other to interengage said means and relatively lowering the tilted section into line with the other section whereby the shoe or shoes will guide the lower portions of the pipe ends into mating relation, and welding the joint about the joint and through said recess.

19. In a welded pipe joint including interengaging means including a projection and recess on adjoining pipe ends for positioning the same in mating relation, whereby the joint can be welded, said means permitting joining of the pipe sections out of alignment with each other, said joint being welded about the joint and through said recess.

BYRON R. BARDER.